United States Patent
Lu

(10) Patent No.: US 7,779,828 B2
(45) Date of Patent: Aug. 24, 2010

(54) BARBECUE GRILL WITH A MOVABLE HEATER

(76) Inventor: Chien-Chang Lu, P.O. Box 90, Tainan 70499 (TW)

( * ) Notice: Subject to any disclaimer, the term of this patent is extended or adjusted under 35 U.S.C. 154(b) by 0 days.

(21) Appl. No.: 12/126,944

(22) Filed: May 26, 2008

(65) Prior Publication Data
US 2009/0288654 A1    Nov. 26, 2009

(51) Int. Cl.
*F24B 1/182*    (2006.01)
(52) U.S. Cl. .......................... 126/25 R; 126/29; 99/450
(58) Field of Classification Search ............... 126/25 A, 126/25 R, 538, 1 R, 237, 228, 29, 28, 9 R, 126/37 A, 37 B, 39 D, 39 E, 60, 231, 58, 126/207, 209, 261, 41 R, 40, 39 R; 431/278, 431/48, 127, 142, 143; 219/620, 656, 725, 219/748, 72, 74, 227, 404, 434, 442, 453.11
See application file for complete search history.

(56) References Cited

U.S. PATENT DOCUMENTS

| | | | | |
|---|---|---|---|---|
| 5,758,635 A | * | 6/1998 | Petersen | 126/25 A |
| 6,125,836 A | * | 10/2000 | Felton, Jr. | 126/25 R |
| 2003/0230299 A1 | * | 12/2003 | Bruno et al. | 126/25 R |
| 2006/0070614 A1 | * | 4/2006 | Spangrud | 126/25 R |
| 2009/0025569 A1 | * | 1/2009 | Hatjopoulos et al. | 99/356 |

FOREIGN PATENT DOCUMENTS

KR    862051    * 10/2008

* cited by examiner

*Primary Examiner*—Kenneth B Rinehart
*Assistant Examiner*—Hassan Brown

(57) ABSTRACT

A barbecue grill with a movable heater includes a main body having at least a rail, a heater movably resting on the rail, and a storing plate closable on the main body. The heater can be freely moved to and from above baking foods placed on a net to let a user operate conveniently and safely. And, with the storing plate closed on the main body, not only the heat can be kept in the main body to shorten baking time for saving energy, but also the well-baked foods and the frozen foods can be put on the storing plate for respectively keeping warm and being unfrozen to increase space.

2 Claims, 4 Drawing Sheets

BARBECUE GRILL WITH A MOVABLE HEATER

BACKGROUND OF THE INVENTION

1. Field of the Invention

This invention relates to a barbecue grill, particularly to one provided with a movable heater that can be freely moved to and from above baking foods to effectively utilize energy for saving cost and to prevent a user from being burned by the heating source while turning the baking foods upside down, and a storing plate hung on a main body to keep heat from dispersing outward for saving energy and space.

2. Description of the Prior Art

Commonly, when a conventional barbecue grill is employed to bake foods, the heating source is put under the grill to provide energy to bake the foods placed on the grill. However, as the heating source of the conventional barbecue grill is always fixed immovably, foods baked on the grill are deposited from the heating source in diverse distances, having to be moved always to ensure them evenly and sufficiently baked. Moreover, most of the conventional barbecue grills are formed open that heating energy is apt to flow up and out to lower heating efficiency, and dishes and tables used for placing well-baked foods have to be additionally prepared, not only occupying too much space but also inconvenient for carrying around.

SUMMARY OF THE INVENTION

The main objective of this invention is to offer a barbecue grill provided with a heater that can be freely moved to and from above baking foods so as to effectively utilize energy for saving cost.

The second objective of this invention is to protect a user from burned by the heater while turning baking foods upside down as the heater is removable.

The third objective of this invention is to use a storing plate helpful for keeping the heat from escaping up and out, able to reduce baking time to save energy as well.

The fourth objective of this invention is to use the storing plate to place frozen foods thereon to be unfrozen by the warmth and to place well-baked foods thereon for continuous warming, so as to save some space.

The main characteristics of the invention are a main body provided with a rail, at least a heater resting on the rail, and at least a storing plate provided with at least a hooking groove for hooking on the main body.

BRIEF DESCRIPTION OF DRAWINGS

This invention is better understood by referring to the accompanying drawings, wherein.

DETAILED DESCRIPTION OF THE PREFERRED EMBODIMENT

Figure 1:
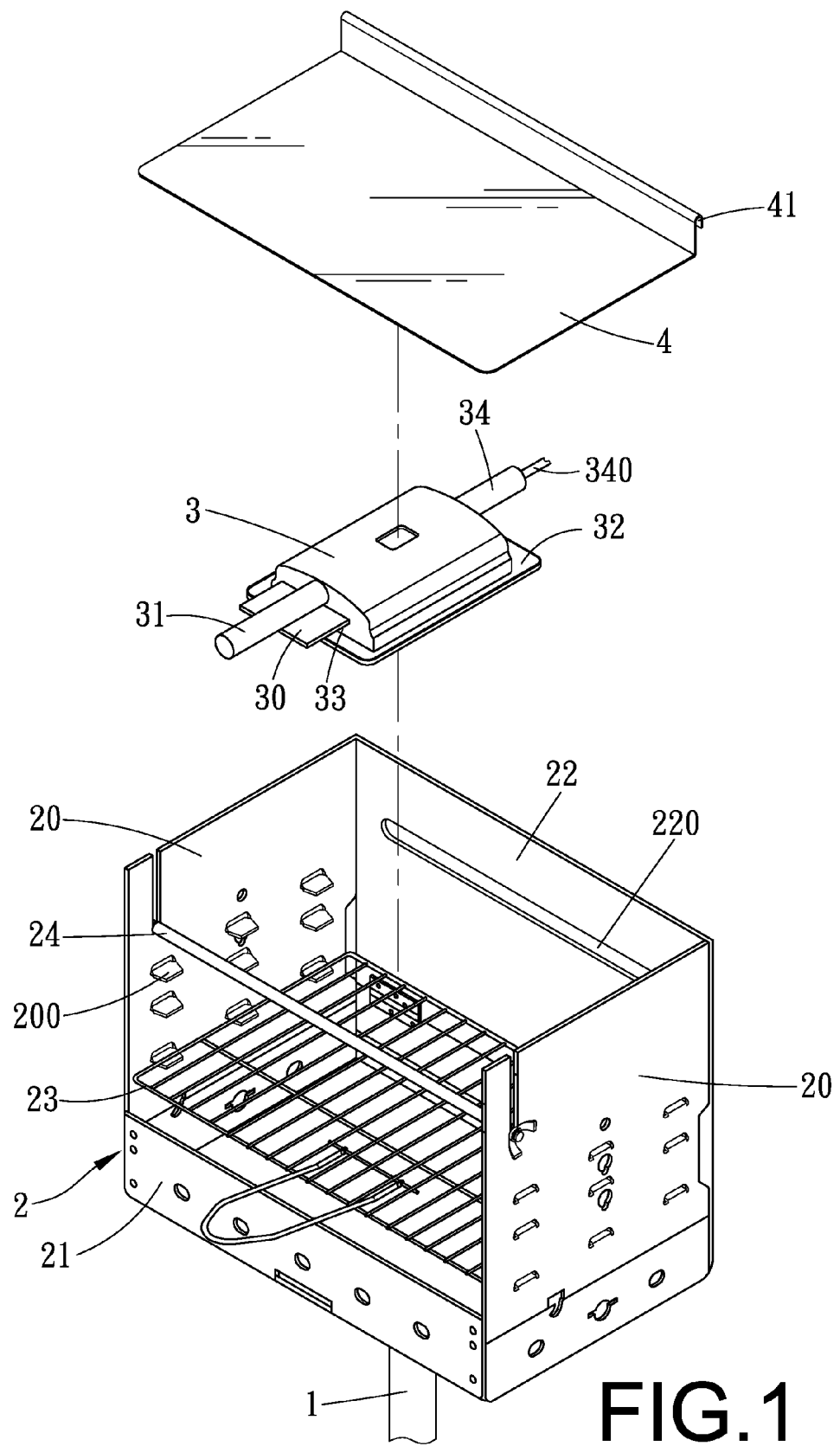
FIG. 1 is an exploded perspective view Of a preferred embodiment of a barbecue grill with a movable heater in the present invention.
Figure 2:
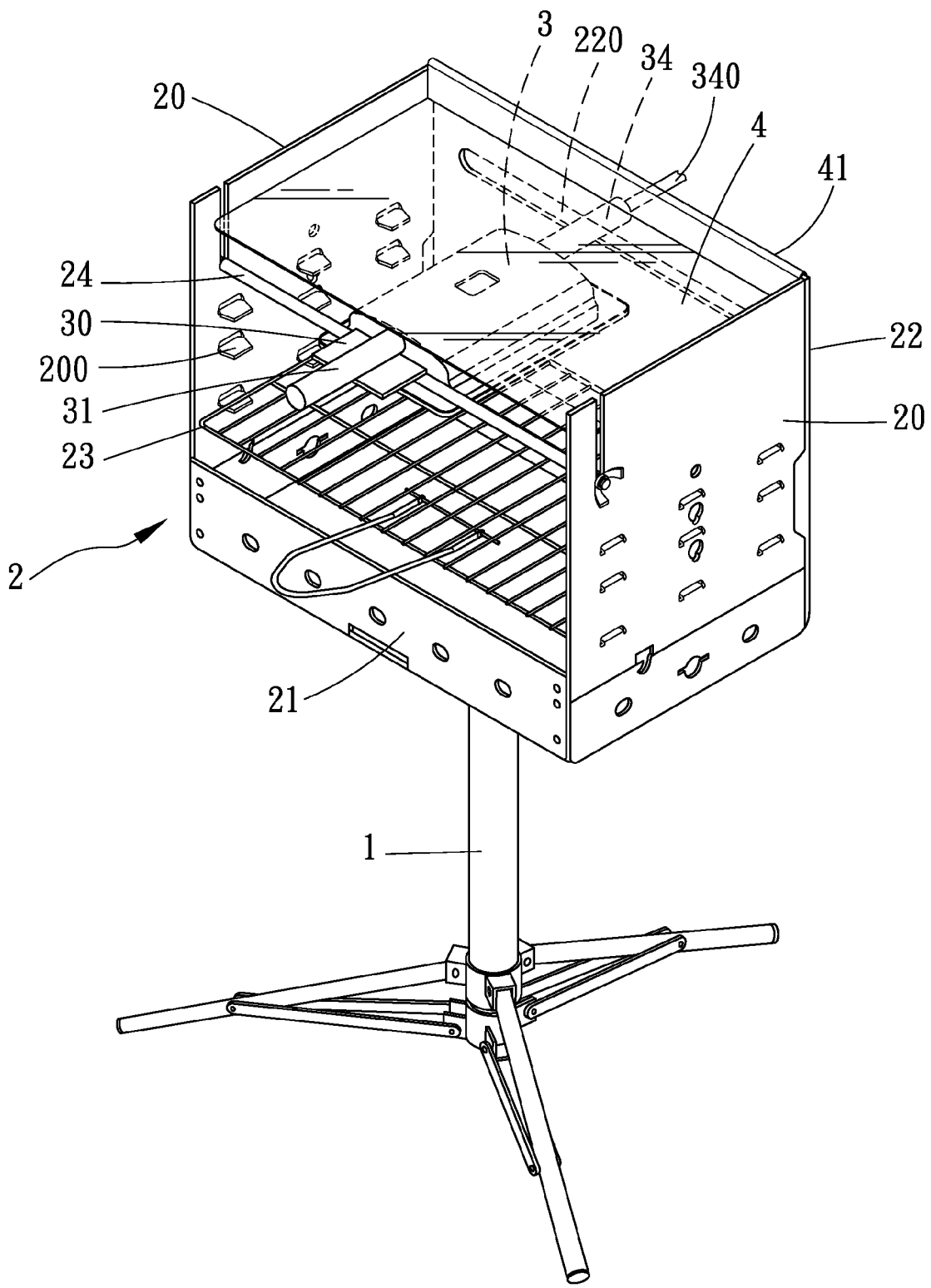
FIG. 2 is a perspective view of the preferred embodiment of a barbecue grill with a movable heater in the present invention.
Figure 3:
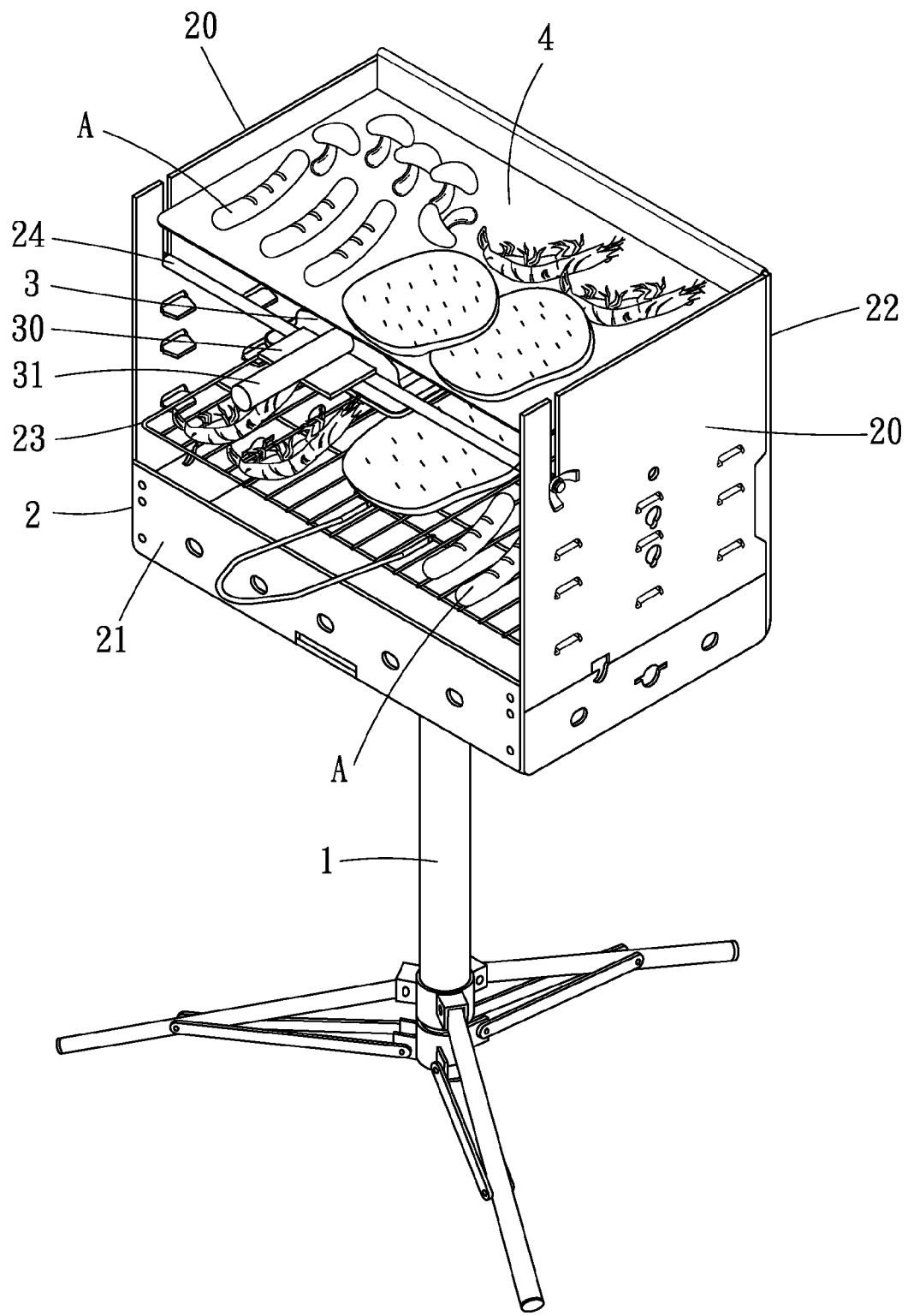
FIG. 3 is a perspective view of the preferred embodiment of a barbecue grill with a movable heater in the present invention, showing it being operated with a storing plate hung on a rear board.
Figure 4:
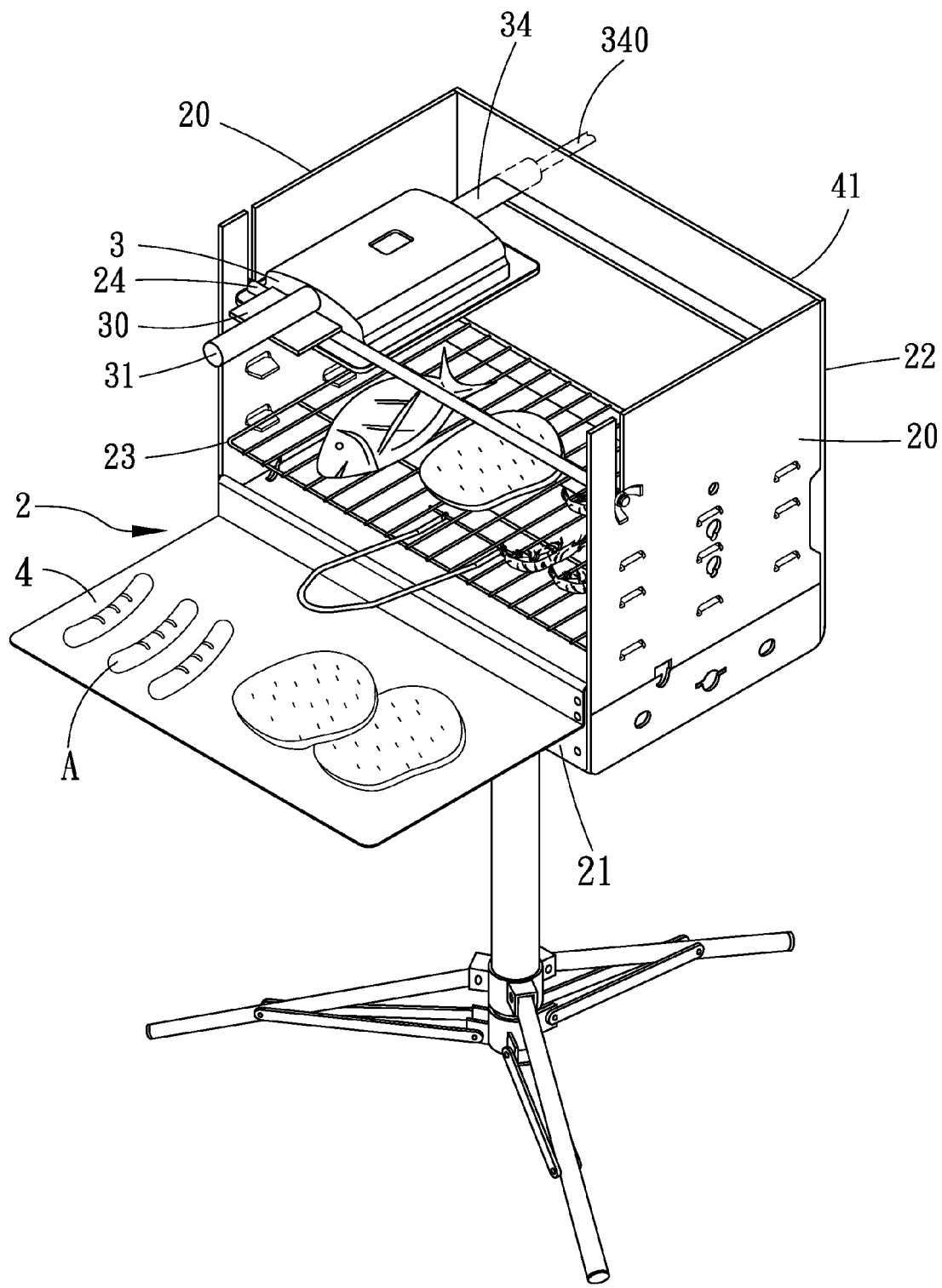
FIG. 4 is a perspective view of the preferred embodiment of a barbecue grill with a movable heater in the present invention, showing it being operated with the storing plate hung on a front board.

As shown in FIGS. 1 and 2, a preferred embodiment of a barbecue grill with a movable heater in the present invention is composed of a stand 1, a main body 2, at least a heater 3 and at least a storing plate 4.

The main body 2 is positioned on the stand 1, provided with two side boards 20, a front board 21, a rear board 22, a roast net 23, and at least a rail 24 installed at its upper portion. Each of the side boards 20 is provided with plural projected sheets 200 positioned on its inner surface to correspond to one another for supporting the roast net. A lengthy horizontal slot 220 is bored in the upper portion of the rear board 22.

The heater 3 is put on the rail 24 of the main body 2, provided with a sliding plate 30 located at its front for staying on the rail 24, a grip 31 extending out from a front side, a circumferential frame 32 extended outward around its edge, a gap 33 formed between the sliding plate 30 and the circumferential frame 32 for being fitted with the rail 24, a supporting rod 34 connected extending rearward from its rear side and passing through the lengthy slot 220 of the rear board 22 of the main body 2, and a gas tube 340 penetrating out of the rear end of the supporting rod 34.

The storing plate 4 is to be closed on the main body 2, provided with at least a hooking groove 41 formed at its rear side.

In using, as shown in FIGS. 1~4, baking foods (A), such as fishes, meat and vegetables, are first deposited on the roast net 23 by assorting them into different sections as they need a different baking time. Next, put the heater 3 in the main body 2, with the gap 33 of the heater 3 fitted with the rail 24 of the main body 2 to keep the sliding plate 30 resting on the rail 24, and with the supporting rod 34 and the gas tube 340 of the heater 3 extended through the lengthy slot 220 of the rear board 22 of the main body 2. Then, the storing plate 4 is steadily closed on the main body 2 by having the hooking groove 41 locked in the top side of the rear board 22 or the front board, for placing foods. By the time, a user just needs to hold the grip 31 of the heater 3 to conveniently move to and from to bake the diverse baking foods (A), instead of moving the baking foods (A). In case that the baking foods (A) are to be turned upside down, the heater 3 can be removed so as to let the user safely do it without being hurt by the heater 3. Moreover, with the rail 24 fitted in the gap 33 surrounded by the sliding plate 30 and the circumferential frame 32 and with the supporting rod 34 confined in the lengthy slot 220 of the rear board 22 of the main body 2, the heater 3 can be restricted thereof to move stably without the risk of turning around. With the storing plate 4 placed on the main body 2, heat can be kept in the main body 2 to lessen baking time for saving energy, and frozen foods can be unfrozen and the well-baked foods can be kept warm inside by the warmth of the main body 2 for saving space.

The invention has the following advantages as can be seen from the foresaid description.

1. As the heater 3 is removable on the main body 2, a user can safely turn foods being baked upside down without fear of being burned.

2. With the heater 3 able to be easily moved to and from, various baking foods deposited on the roast net 23 can be evenly baked by properly moving the heater 3 without removing the baking foods, not only convenient for operation but also saving energy used.

3. By means of the side boards 20, the front board 21 and the rear board 22 of the main body 2, and the storing plate 4 closable on the main body 2, the heat can be effectively kept in the main body 2 from escaping up and out, so as to shorten baking time needed.

4. With the storing plate 4 closed on the main body 2, frozen foods can be previously placed thereon and unfrozen, and the well-baked foods can be kept warm, increasing space for putting baked foods.

5. Frozen foods can previously placed on the storing plate for cutting down the time needed for baking, stepping up baking effect and saving energy at the same time.

While the preferred embodiment of the invention has been described above, it will be recognized and understood that various modifications may be made therein and the appended claims are intended to cover all such modifications that may fall within the spirit and scope of the invention.

What is claimed is:

1. A barbecue grill with a movable heater comprising:
a main body provided with at least a rail;
at least a heater movably resting on said rail of said main body; and
at least a storing plate provided with at least a hooking groove formed at its rear side for locking on said main body;
wherein said heater is provided with a sliding plate, a grip formed to extend out from a front side of said heater, a circumferential frame formed around a circumferential edge of said heater, a gap formed between said sliding plate and said circumferential frame, a supporting rod and a gas tube connected at a rear side of said heater.

2. The barbecue grill with a movable heater as claimed in claim 1, wherein said main body is provided with two side boards, a front board, a rear board having a lengthy horizontal slot.

* * * * *